US006941602B2

(12) United States Patent

Brubaker et al.

(10) Patent No.: US 6,941,602 B2

(45) Date of Patent: Sep. 13, 2005

(54) SELF ADJUSTING, CONTOURING CUSHIONING SYSTEM

(75) Inventors: Clifford E. Brubaker, Wexford, PA (US); David M. Brienza, Allison Park, PA (US)

(73) Assignee: Dynamic Contours, LLC, Allison Park, PA (US)

( * ) Notice: Subject to any disclaimer, the term of this patent is extended or adjusted under 35 U.S.C. 154(b) by 0 days.

(21) Appl. No.: 10/319,156

(22) Filed: Dec. 13, 2002

(65) Prior Publication Data

US 2003/0121102 A1 Jul. 3, 2003

Related U.S. Application Data

(63) Continuation-in-part of application No. 09/635,954, filed on Aug. 10, 2000, now Pat. No. 6,519,797.

(60) Provisional application No. 60/148,193, filed on Aug. 10, 1999.

(51) Int. Cl.[7] .......................... A47C 27/10; F16K 15/00

(52) U.S. Cl. ............................ 5/655.3; 5/654; 137/523

(58) Field of Search ................................ 137/522, 523, 137/512, 223, 224, 226, 225; 251/335.1, 335.2, 339; 5/701, 707, 710–713, 654, 655.3; 36/29; 297/200, DIG. 3

(56) References Cited

U.S. PATENT DOCUMENTS

| | | | | | |
|---|---|---|---|---|---|
| 1,282,980 | A | * | 10/1918 | Takach | 5/706 |
| 2,434,641 | A | | 1/1948 | Burns | |
| 3,303,518 | A | | 2/1967 | Ingram | |
| 3,312,213 | A | * | 4/1967 | Timm | 602/13 |
| 4,005,326 | A | | 1/1977 | Suga | |
| 4,120,061 | A | | 10/1978 | Clark | |
| 4,541,136 | A | | 9/1985 | Graebe | |
| 4,698,864 | A | | 10/1987 | Graebe | |
| 4,707,872 | A | | 11/1987 | Hessel | |
| 5,009,391 | A | * | 4/1991 | Steigerwald | 251/149.1 |
| 5,052,068 | A | | 10/1991 | Graebe | |
| 5,152,023 | A | | 10/1992 | Graebe | |
| 5,163,196 | A | | 11/1992 | Graebe et al. | |
| 5,326,071 | A | * | 7/1994 | Gunness | 251/145 |
| 5,364,162 | A | | 11/1994 | Bar et al. | |
| 5,369,828 | A | | 12/1994 | Graebe | |
| 5,456,284 | A | * | 10/1995 | Ryan et al. | 137/522 |
| 5,487,197 | A | | 1/1996 | Iskra, Jr. et al. | |
| 5,502,855 | A | | 4/1996 | Graebe | |
| 5,561,875 | A | | 10/1996 | Graebe | |
| 5,596,781 | A | | 1/1997 | Graebe | |
| 5,638,565 | A | | 6/1997 | Pekar | |
| 5,640,731 | A | | 6/1997 | Toedter | |
| 5,845,352 | A | | 12/1998 | Matsler et al. | |
| 6,089,260 | A | * | 7/2000 | Jaworski et al. | 137/512 |
| 6,519,797 | B1 | * | 2/2003 | Brubaker et al. | 5/654 |

* cited by examiner

*Primary Examiner*—Michael Trettel

(74) *Attorney, Agent, or Firm*—Thorp Reed & Armstrong, LLC

(57) ABSTRACT

A cushion for seats, wheelchairs, mattresses, etc. is disclosed. The cushion includes fluid-filled cells. Each cell is in fluid communication with adjacent cells via conduits. Constrictures such as check-valves and duckbill valves may be located inside the conduits to restrict or otherwise regulate fluid flow into or out of a particular cell. A control pin may be used to selectively enable or disable said constrictures. In this way, the cushion may be customized on a cell-by-cell basis, providing a cushion that can be tailored to the individual needs of the patient.

7 Claims, 8 Drawing Sheets

SELF ADJUSTING, CONTOURING CUSHIONING SYSTEM

This application is a continuation-in-part of U.S. patent application Ser. No. 09/635,954 filed 10 Aug. 2000, now U.S. Pat. No. 6,519,797, which claims the benefit of U.S. Provisional Application No. 60/148,193 filed Aug. 10, 1999.

BACKGROUND

1. Field of the Invention

The present invention relates to cushions, and in particular to seat cushions having an array of individual, expandable, fluid-filled cushioning cells for use by persons confined to wheelchairs and the like.

2. Description of the Related Art

In the United States alone, more than 247,000 individuals have complete or partial paralysis and more than 600,000 nursing home residents use wheelchairs. Many of these people require the use of a pressure-reducing cushion to minimize the risk of sitting-induced pressure ulcers. The prevalence of pressure ulcers among all nursing home residents is estimated between 7% and 23%. The incidence rate among other populations with mobility impairments is even higher; it has been estimated that between 50% and 80% of persons with spinal cord injury will develop a pressure ulcer. Even the lowest estimates indicate that pressure ulcers present a significant health care problem.

Pressure ulcers/sores are extremely dangerous and difficult to cure. These pressure sores, or decubitus ulcers, typically form in areas where bony prominences exist, such as the ischia, heels, elbows, ears and shoulders. Typically, when sitting, much of the individual's weight concentrates in the regions of the ischia, that is, at the bony prominences of the buttocks, and unless frequent movement occurs, the flow of blood to the skin tissue in these regions decreases to the point that the tissue breaks down. This problem is well known and many forms of cushions are especially designed for wheelchairs for reducing the concentration of weight in the region of the ischia. These cushions generally seek to distribute the user's weight more uniformly over a larger area of the buttocks.

Another area where pressure ulcers occur is in the trochanter area. Both cushions and bases for the cushions are often shaped so that pressure is relieved on the ischia and the trochanters. A significant problem with wheelchair-type cushions is stabilization of the user so that he has a feeling of security when sitting in the wheelchair.

Conventional cushioning devices for supporting the human body, such as the typical mattress, seat cushion or padded back rest, do not distribute the weight of the supported body evenly over the area of the body that is in contact with the cushioning device. For example, in the case of a mattress, the buttocks or hips, and likewise the shoulders, sink further into the mattress than the lumbar region of the back. Since most conventional cushioning devices exert a supporting force that is proportional to the amount they are deflected, those portions of the body which sink deepest into the cushioning device experience a resisting force per unit area that is considerably greater than those body portions that deflect the cushioning device only slightly. For those individuals who are confined to beds or wheelchairs for extended periods of time, the unequal distribution of supporting forces deforms the vascular system and reduces blood flow, which can lead to extreme discomfort and can even be debilitating in the sense that bed sores often develop at the skin areas where the supporting force is greatest.

While cushions which derive their cushioning properties from inner springs or foam material are quite common and inexpensive to manufacture, and offer good stability, they suffer the inability to distribute loads or develop restoring forces evenly to the object they are supporting. For example, expanded polymer foam of a resilient character, such as polyurethane, is a popular cushioning material for seating, and indeed finds widespread use in furniture and automotive seats. But resilient polymer foam does not produce the most desirable relationship between force and displacement. Far from this relationship being linear, it tends to be skewed, such that the force increases at a greater rate than the displacement, and this makes the material unusually stiff when an individual or object such as a bony prominence is deeply immersed in it. Thus, the region of the body that is most susceptible to injury receives the greatest resisting force per unit area, compounding the injury or increasing the risk thereof.

An effective cushion reduces pressure over bony prominences while providing stability and support, primarily through envelopment. The main types of wheelchair cushions can be described as fluid, compressive (elastic, viscoelastic), or suspension cushions. Fluid and fluid-like seat cushions achieve envelopment by accommodation of bony prominences and maintain the condition by virtue of their ability to dynamically adjust to changing loading conditions. However, the dynamic nature of fluid-filled cushions often leads to the undesirable characteristic of poor stability.

Cushions made from elastic materials such as high resilient foams must rely on pre-contouring to achieve envelopment. Such a cushion has no ability to dynamically adjust beyond the limits of the compliance of the material as defined by its material properties. That is, these cushions cannot change shape without a tendency to return to their original shape. When a person sits on the cushion both the cushion and the buttocks will deform until force equilibrium is reached. In the cushion, the counter forces will be greatest where there is the most deformation and least where there is low deformation as discussed above. Elastic cushions provide the advantage of enhanced stability due to the foam's tendency to hold its shape and, thus, hold the person in place. A fluid-like cushion instead changes its shape to accommodate changing load. The disadvantage of pre-contoured compared to fluid-like cushions is that the distribution of forces is sensitive to the relative match between the cushion and the buttock shapes, and to the positioning of the buttocks on the surface.

Cushions made from viscoelastic materials have a combination of elastic and fluid properties, giving such cushions some ability to reconfigure in a memoryless fashion and some ability to provide stability through resilience. An optimum balance of viscous and elastic response is a matter of personal preference and need, however, and may vary significantly from person to person.

Suspension cushions use the strategy of removal of material in the areas that commonly experience high pressure and use covers under tension to support these areas in a suspension-like manor. Suspension cushions remove material from the ischial area, and often the sacral area as well. The successful use of a suspension cushion also, as with a pre-contoured cushion, relies on a consistent positioning of the user on the surface.

Through clinical tests, it has been determined that one of the better methods of preventing the development of bed sores on patients is to support such persons on a series of flexible intercommunicated cells filled with a fluid such as air. Since the cells are intercommunicated all exert an equal supporting force against the engaged individual. Such an arrangement of cells is disclosed in U.S. Pat. No. 3,605,145.

Fluid cell cushions provide a uniform distribution of weight and thus provide good protection from the occurrence of pressure sores. These cushions have an array of closely-spaced air cells which project upwardly from a common base. Within the base the air cells communicate with each other, and thus all exist at the same internal pressure. Hence, each air cell exerts essentially the same restoring force against the buttocks, irrespective of the extent to which it is deflected. U.S. Pat. No. 4,541,136 shows a cellular cushion for use on wheelchairs.

The typical fluid cell cushion provides a highly displaceable surface which tends to float the user. While this reduces the incidence of pressure sores, it detracts from the stability one usually associates with a seating surface. Most of those confined to wheelchairs have little trouble adjusting to the decrease in stability, but for those who have skeletal deformities, particularly in the region of the pelvis and thighs, and for those who lack adequate strength in their muscles, lesser stability can be a source of anxiety.

The stability problem has been attacked by the use of shaped bases such as shown in Graebe, U.S. Pat. No. 4,953,913 and Jay, U.S. Pat. No. 4,726,624. These bases are generally used in conjunction with cushions. Graebe, U.S. Pat. No. 4,953,913 has been used in conjunction with a cellular cushion and a fabric cover. The stability problem also has been addressed in the cellular cushion by the use of zoned areas of inflation as shown in Graebe, U.S. Pat. No. 4,698,864, which shows a zoned cellular cushion with cells of varying height; and Graebe, U.S. Pat. No. 5,052,068, which shows another form of zoned cushions with cells of different heights. By varying the pressure between zones, one can accommodate for skeletal deformities, while still maintaining protection against pressure sores.

Graebe, U.S. Pat. No. 5,111,544, shows a cover for a zoned cellular cushion which keeps the cells from deflecting outwardly. This cover has a stretchable top, a skid resistant base, and a non-stretchable fabric side panel area.

Another problem with cushions of the prior art is the inability to accommodate individual shapes and sizes, or to be customized to provide greater support in areas needing it. One approach has been to employ cushions having separate adjustable zones, as discussed above, and such as described in U.S. Pat. No. 5,163,196.

Typically, a zoned cellular cushion has a separate filling stem and valve for each of its zones. The user opens the valve of each stem and introduces air into the zone for that stem, usually with a hand pump, and then releases the air from the zones until the desired posture is achieved. In a more sophisticated arrangement, a hose kit connects a single pump to a manifold which in turn is connected to the several valves through separate hoses. These hoses are fitted with separate hose clamps so that the air from the pump may be directed to the cells of the individual zones independently, and likewise the air can be released from them independently, all by manipulating the clamps. The hoses of the hose kit lie externally of the cushion and may become entangled in components of a wheelchair. Furthermore, by reason of their remote location, the hose clamps are difficult to manipulate. Also, such a design is not automatically adjustable, rather, may require repeated and cumbersome manual adjustment in order to achieve the desired level of comfort. In addition, while pressure may be varied from one zone to the next, all cells in a particular zone exert the same pressure, and fluid flow cannot be controlled between individual cells.

Other attempts to adjust cellular cushions include manually tying off cells in regions of the cushion, such as those regions supporting the ischia. Such efforts are cumbersome, however, and provide at best a trial and error solution to the problem.

Accordingly, an advance in the art could be realized if a cushion could be provided that offered the advantages of automatic contour adjustment, and that combined with optimum pressure-reducing and flexibility capabilities of air floatation, or cellular cushions, with stability closer to that of foam cushions.

SUMMARY OF THE INVENTION

The present invention addresses the shortcomings of the prior art by providing a cushion that automatically controls shape, interface pressure, and provides relative stiffness and seating stability.

The cushion provides the ability to produce both an isobaric surface interface with an indenting body or an a priori condition at the interface. The cushion is based on an array of interconnected cells. The accommodation of the cushion to an indenting body is accomplished by the displacement of fluid from compartments receiving the indentor to peripheral cells. This arrangement is comparable to connecting cells to a plenum chamber, but adds the novel feature of using constrictures such as miniature check valves between communicating cells. The check-valves may be selectively enabled or disabled, for example, through the use of a control pin. This feature gives the cushion the ability to selectively control flow rates and pressures (based on the amounts of fluid delivered) among communicating cells. Indeed, flow rates and pressures can be controlled for every individual cell, rather than just zones of cells.

In a preferred embodiment, the cushion conduits/valves are laminated between thin layers, which together form the "backbone" or structural continuity between cells. Collapsible (and distensible) pads on either or both sides (i.e., top and bottom) of the structural or "backbone" layer constitute the completed cellular cushion.

These and other aspects and advantages of the present invention are set forth in greater detail in the following detailed description and accompanying figures.

BRIEF DESCRIPTION OF THE DRAWINGS

In the accompanying drawings, which form a part of the specification, and wherein like numbers refer to like parts wherever they occur:

FIG. 12(*b*) illustrates the tool of FIG. 11 being used to enable one check-valve of the connecting conduit as illustrated in FIG. 9 according to one embodiment of the present invention.

DETAILED DESCRIPTION

Figure 1:
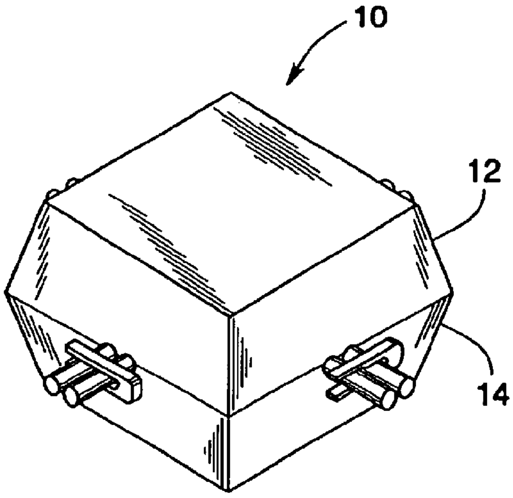
FIG. 1 is an isometric view of a single cushioning cell according to one embodiment of the present invention.

The ideal cushion would support a person, while at the same time retain the buttocks in an uncompressed state, as close as possible to that of being suspended in air or floating in water. While such an ideal cushion is not likely possible, it is possible, according to the present invention, to model a customized cushion in a way to maximize contact area, optimize pressure distribution, and other parameters so as to closely approximate an ideal situation. Because each patient has unique cushioning requirements, dictated by such variables as weight, sex, posture, build, injury, etc., the ideal cushions for any given patient should be uniquely designed for that patient. Because the present invention permits cell-by-cell customization, in terms of pressure and/or flow rate of fluid from one cell to the next, it offers the ability to tailor the cushion to each patient's unique needs.

The cushion may be customized with the assistance of a software system based on data for each patient, such as weight, sex, local peculiarities, etc., in order to create optimal cushioning by taking advantage of the unique cell-by-cell customizing features of the present invention, which will now be described.

The present invention incorporates individual, expandable (i.e., vertically distensible), fluid-filled, cushioning cells. The cushion incorporates reciprocal, one-way connections between all immediately adjacent cushioning cells. The flow of fluid (gas or liquid) from any particular cell to all contiguous cells is based on the relative internal pressures among the cells. When a threshold pressure is exceeded in a cell, a one-way (e.g., duckbill) valve opens to allow fluid to flow out to one or more adjacent cells experiencing a lower internal pressure. Upon being subjected to external loading (i.e., from an indenting force) fluid flows from cells in areas of higher pressure to cells in areas of lower pressure. This process continues until a uniform or a priori pressure distribution is achieved among the cells. A concomitant effect is a change in shape of the cushion to accommodate the differential compressive forces of the indenting surface. An a priori pressure distribution (i.e., other than isobaric) can be achieved over the system of cells by having higher opening pressures for valves in selected regions of cells in the cushion array. For example, areas of the cushion supporting regions known to be prone to development of pressure sores, such as the ischia, sacrum, and coccyx can be filled with cells that have a different pressure/flow distribution than other areas of the cushion, by virtue of the opening pressures of the valves for those cells relative to opening pressures for valves for cells in other regions.

The rate of change in shape of the appliance due to an indenting force is a function of the flow rate of the fluid. The ability to control flow rate between cells provides the capability to "set" the compliance of the cushions. This, in turn, allows a measure of control over the stability of the cushion (or, perhaps more properly, the stability of a person seated on the cushion). The rate of flow is governed primarily by the external forces exerted on the cushion, the viscosity of the fluid, the lumen size (i.e., the inside diameter) of the connecting conduits, and the degree of constriction applied to these connecting links. In the case of air, the primary considerations are lumen size and constriction force. Air may, in certain circumstances, be the preferred fluid, while in other circumstances, a more viscous fluid, or even a gel, might be the preferred fluid for filling the cells of the cushion.

Referring now to FIG. 1, there is illustrated a perspective view of an individual fluid cushion cell of the present invention. The cell, generally 10, may comprise top 12 and bottom 14 halves which enclose a hollow interior for filling with a fluid such as air. While the cell of FIG. 1 is illustrated as being semi-cubical in shape, other shapes, including hexagonal, cylindrical, etc. can be employed for individual cells.

Figure 2:
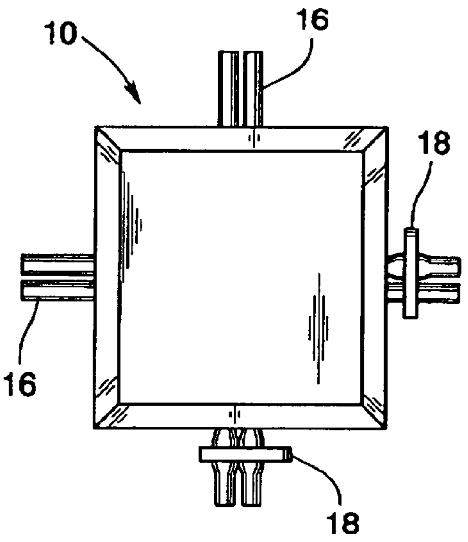
FIG. 2 is a top view of the cell of FIG. 1, illustrating differential and bi-directional flow restriction according to one embodiment of the present invention.

As illustrated in FIG. 2, the cushioning cell 10 may include a plurality of connecting conduits 16 allowing fluid to flow into and out of the hollow interior of the cell 10. Two pairs of connecting conduits 16 illustrated in FIG. 2 include clips 18 that can be used to constrict the conduits 16, thereby providing differential, and in the case of FIG. 2, bi-directional, fluid flow restriction to the cell 10.

In a preferred embodiment of the invention, each individual connecting link or conduit 16 is unidirectional (i.e., no backflow is permitted). This means that once air is expelled from the cell via an outflow conduit, air may only reenter that cell via a separate inflow conduit from an adjacent cell.

Figure 3:
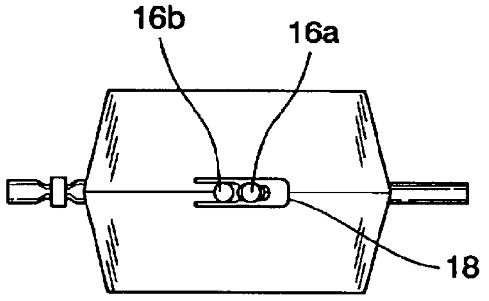
FIG. 3 is a side view of the cell of FIG. 1, illustrating the differential flow/pressure control according to one embodiment of the present invention.
Figure 4:
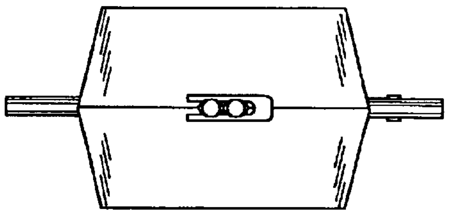
FIG. 4 is a side view of the cell of FIG. 1, illustrating bi-directional flow reduction only according to one embodiment of the present invention.

By introducing a selective constriction in one of the conduits between two cells, as illustrated in FIGS. 2 and 3, it is possible to create a potential internal pressure differential between adjacent cells. It is also possible to selectively control only the rate of flow to and from a cell by equally constricting the two communicating links between adjacent cells, as illustrated in FIGS. 2 and 4. As illustrated in FIG. 3, the constrictor clip 18 may be designed to constrict one conduit 16*a* more than the other 16*b*. This, in turn, allows for the possibility of inducing different flow rates into the cell 10 than out of it, which in turn, allows creating a priori pressure distributions, which may be envisioned from the valve elements and constricting "clips" illustrated in FIGS. 5–8, which will now be described.

Figure 5:
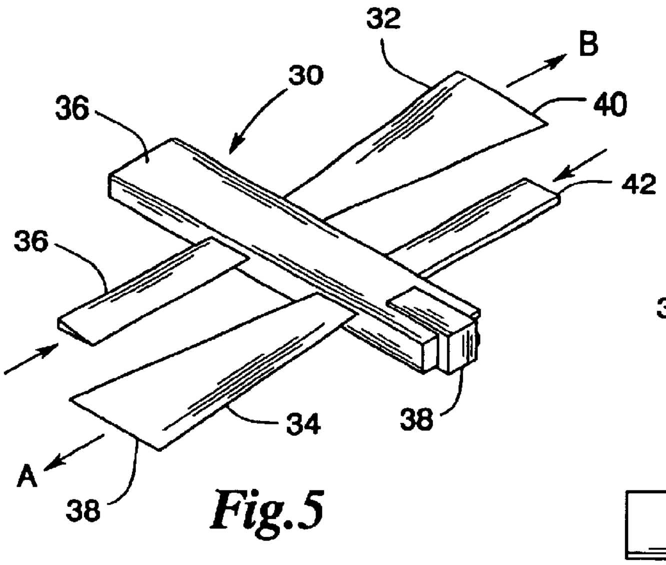
FIG. 5 is a perspective view of reciprocal conduits with duckbill valve terminations and with differential bi-directional constrictions comprising clips according to one embodiment of the present invention.

Referring now to FIG. 5, there is illustrated a constrictor clip, generally 30, and two unidirectional connecting links or conduits 32 and 34 in the form of duckbill-type check valves. The directional arrows A and B for these conduits 34, 32 illustrate the direction of fluid flow permitted by the check valve. Thus, the pair of connectors 32, 34 comprise a link between two adjacent cells, with connector 32 being an outflow conduit at its one end 36 and connector 34 being an inflow conduit at its end 38 for one cell. Connector 32 doubles as an inflow conduit at its other end 40 for an adjacent cell, and connector 34 doubles as an outflow conduit for that same adjacent cell at the other end 42 of that connector 34.

The constrictor or clip 30 of the present invention may assume different configurations depending on the objectives desired for adjacent cells. The constrictor 30 illustrated in FIG. 5 has a configuration approximating that illustrated in FIG. 8(*b*), and therefore allows for differential bi-directional constriction of the conduits 32 and 34. In the embodiment illustrated in FIG. 5, the constrictor clip 30 provides greater constriction to conduit 32 and less constriction to conduit 34, which means that for a given pressure exerted on adjacent cells linked by conduits 32 and 34, air flow will tend to be in the direction of the arrow A and into the cell served by the outflow portion 38 of conduit 34. The clips thus can be used to vary fluid flow rates between cells. The clips also can be used to establish a pressure which must be exceeded before flow to or from a cell occurs. Clips may also be employed to preclude altogether fluid flow into or out of individual cells, thereby isolating certain cells from other interconnected cells, allowing for pressure differentials from cell to cell even after the interconnected cells that are not isolated have achieved an isobaric state.

The constrictor clip 30 illustrated in FIGS. 5–8 includes a generally U-shaped clip portion 26 which mates with a generally U-shaped fastener portion 28 as illustrated. Other designs are, of course possible. Indeed, it is possible to avoid the use of clips altogether by employing conduit/check valves designed with stiff "lips," opening once a desired pressure is achieved and/or by using conduits of varying diameter in order to create differential flow. Use of the clips 30, however, allows all conduits/check valves to be of the same design.

Figure 6:
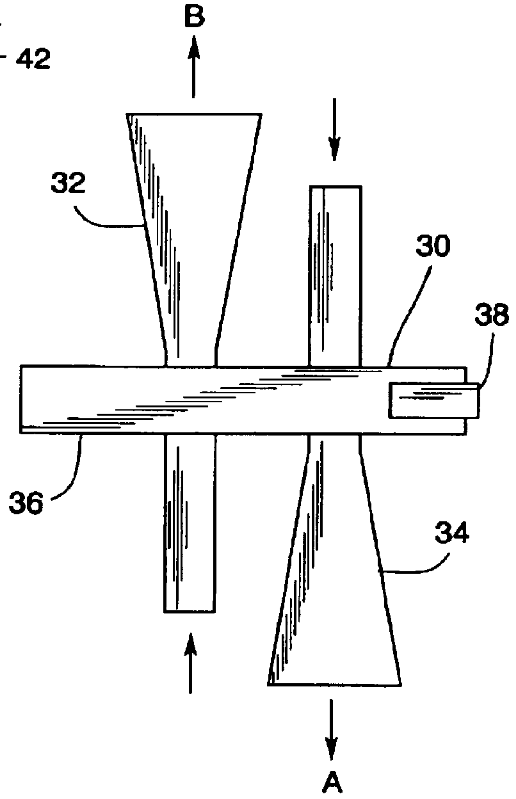
FIG. 6 is a top view of the assembly of FIG. 5 according to one embodiment of the present invention.

FIG. 6 is an overhead view of the reciprocal conduits with duckbill valve terminations and with differential bi-directional constrictions.

Figure 7:
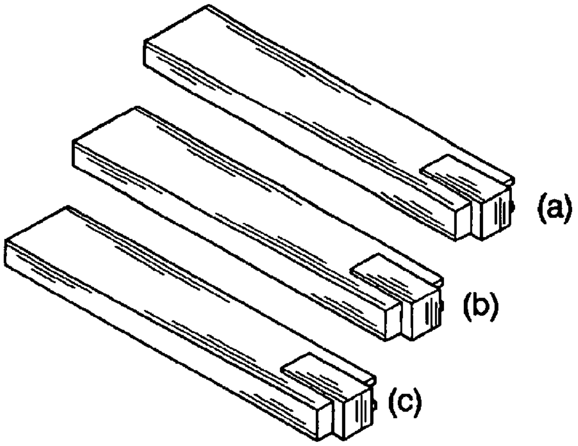
FIG. 7 is a perspective view of preferred constrictor clips (a–c) according to one embodiment of the present invention.

FIG. 7 illustrates different constrictor clips (a, b, and c) which may be useful in providing differential bi-directional constriction according to the teachings of the present invention.

Figure 8:
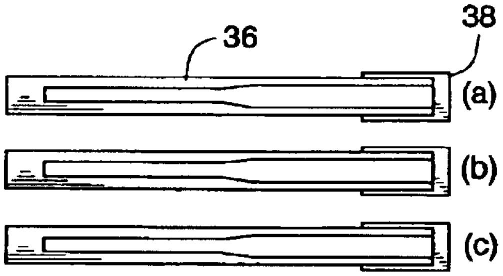
FIG. 8 is a profile view of constrictor clips of the present invention of FIG. 7, showing differential bi-directional constrictions in (a) and (b) and simple reduced flow constriction in (c) according to one embodiment of the present invention.

FIG. 8 is a profile view of the constrictor clips of FIG. 7 showing differential bi-directional constrictions (a and b) and simple reduced flow constriction (c).

Figure 9:
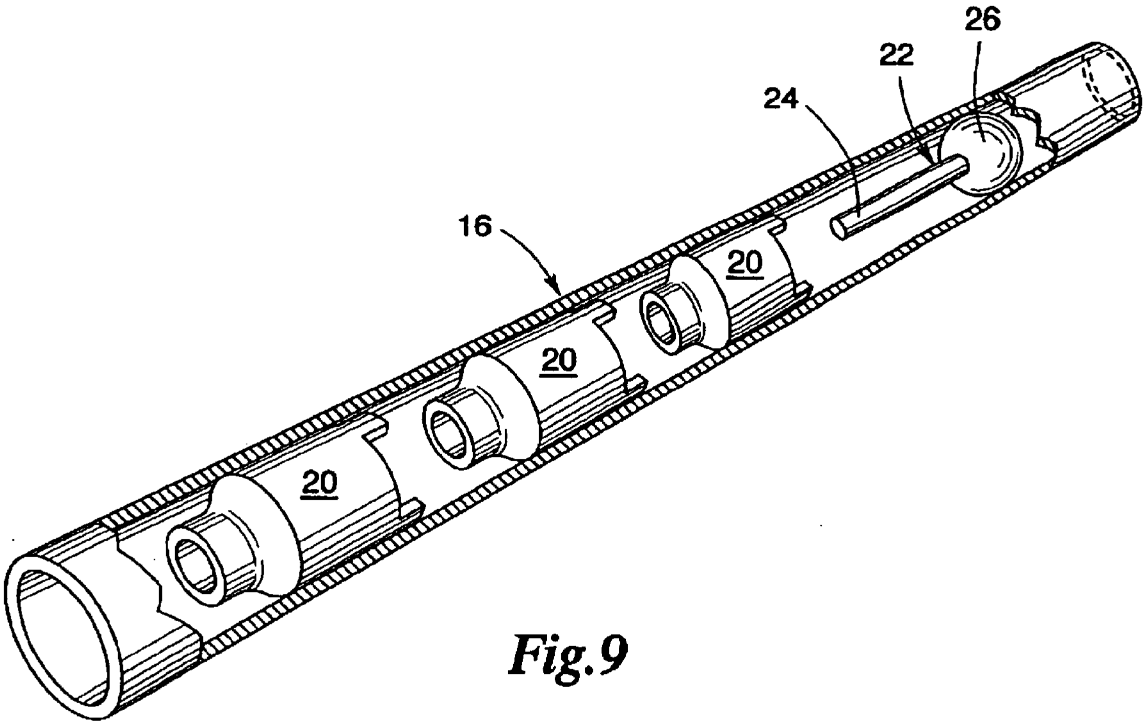
FIG. 9 is a detailed view of a connecting conduit as shown in FIGS. 1–6 with a series of check valves and a differential pressure control pin according to one embodiment of the present invention.

FIG. 9 is a detailed view of a connecting conduit 16 as shown in FIGS. 1–6 according to one embodiment of the present invention. As seen in FIG. 9, a series of check valves 20 and a control device, in this case a control pin 22, are located inside the conduit 16. The check-valves 20 limit fluid flow in the conduit 16 to a single direction. The check-valves 20 may have equal opening threshold pressures or may be selected to have different opening threshold pressures. The opening threshold pressure refers to the differential of pressure on the two sides of a check-valve 20.

A series of three (3) check-valves 20, each with an opening threshold pressure of 10 mm. of Hg (for example) is shown in FIG. 9. Thus, it should be noted that the three (3) check-valves 20, when closed, maintain a total pressure differential of 30 mm of Hg between contiguous cells 10. If only two (2) of the three (3) check-valves 20 are closed, the total differential pressure between contiguous cells 10 (i.e., across the two (2) enabled check-valves 20) would be 20 mm. Hg. Thus by selecting the opening threshold pressure for each check-valve 20 and by controlling the number of check-valves 20 that are enabled, the total differential pressure between contiguous cells 10 may be closely controlled.

Figure 10:
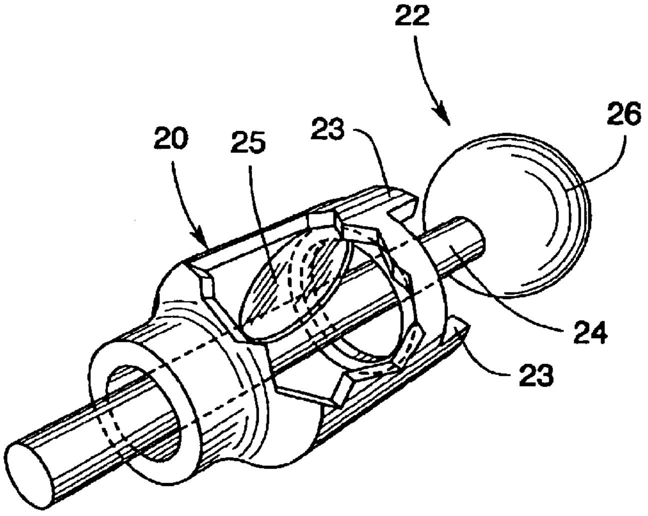
FIG. 10 is a more detailed view of one of the check valves and the differential control pin shown in FIG. 9 according to one embodiment of the present invention.
Figure 19:
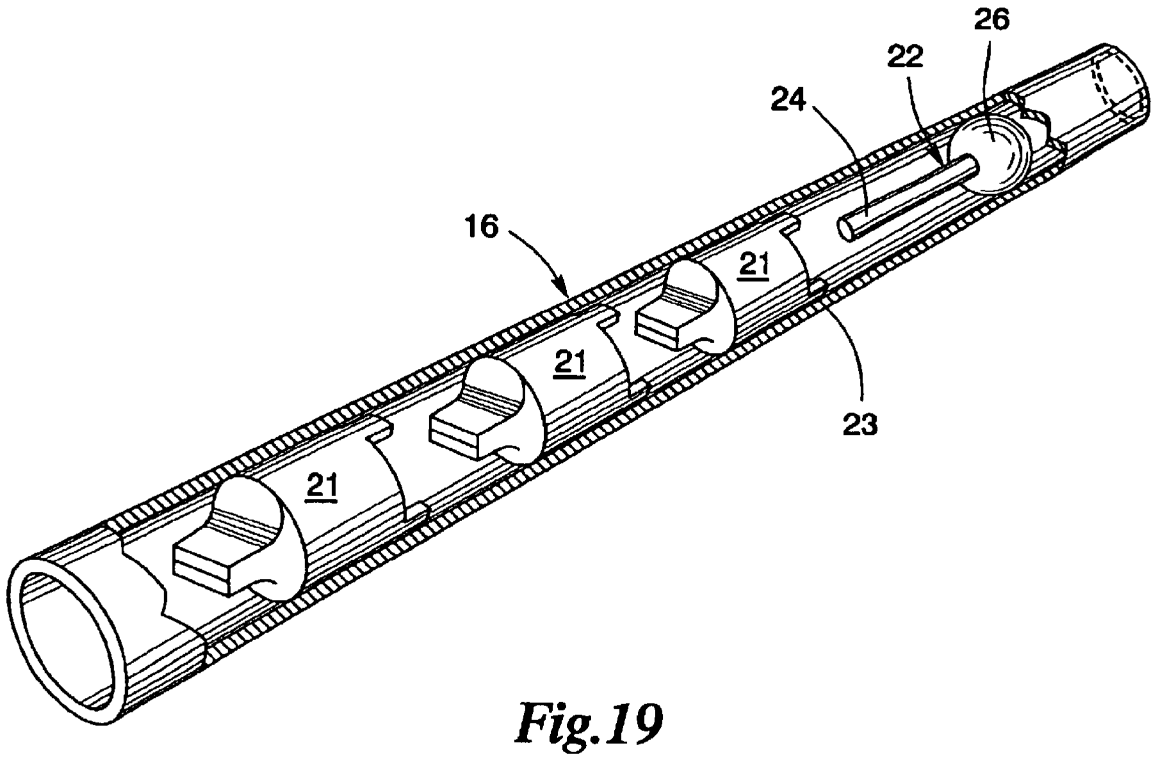
FIG. 19 is a perspective view of a connecting conduit as shown in FIGS. 1–6 with a duckbill valve and a control pin according to one embodiment of the present invention.

In the current embodiment (as illustrated in FIGS. 9 and 10), the control pin 22 is advanced through one or more check-valves 20, thereby overcoming the checking function of the check-valves 20. By sliding the control pin 22 to open successive serial check-valves 20 within the conduit 16, it is possible to selectively disable (i.e., open) as many of the serially arranged check-valves 20 as may be desired. Accordingly, the current embodiment allows for the selection of the pressure differential between two adjacent cells 10. It should be noted that other types of valves or flow restriction devices, for example duckbill valves 21 as illustrated in FIG. 19, may also be used combination with or substituted for the check valves 20 while remaining within the scope of the present invention.

FIG. 10 is detailed view of one of the check valves 20 and the control pin 22 shown in FIG. 9 according to one embodiment of the present invention. As clearly seen in FIG. 10, the control pin 22 has an elongated end 24 and a spherical end 26. In the current embodiment, the diameter of the elongated end 24 is less than the inner diameter of the check-valve 20, thus the elongated end 24 may pass through the check-valve 20 thereby disabling the check-valve 20 (e.g., holding the flapper 25 open). In contrast, the diameter of the spherical end 26 is greater than the inner diameter of the check-valve 20, thus the spherical end 26 acts as a stop preventing the control pin 24 from passing completely through the check-valve 20. Furthermore, the spherical end 26 may aid the advancement and retraction of the control pin 22 relative to the conduit 16.

It should be noted that, to reduce the amount of flow restriction caused by the control pin 22, the elongated end 24 and the spherical end 26 may be hollow to permit fluid flow through the control pin 22. Additionally, the check-valve 20 (or other flow restriction device) may include a stand off 23 which prevents the spherical end 26 of the control pin 22 from completely blocking the inlet of the check-valve 20. It should be further be noted that the control pin 22 may also be used in conjunction with other flow restriction devices, for example duckbill valves 21 as illustrated in FIG. 19, while remaining within the scope of the present invention. For example, the control pin 22 may be inserted into the aperture of a duckbill valve 21 to hold it open, thus overcoming the checking function of the duckbill valve 21. Other types of valves and valve geometries may require different types of control devices other than control pin 22. For example, a valve having a metallic flapper may be held in the open position by a magnet brought into close proximity to the metallic flapper.

Figure 11:
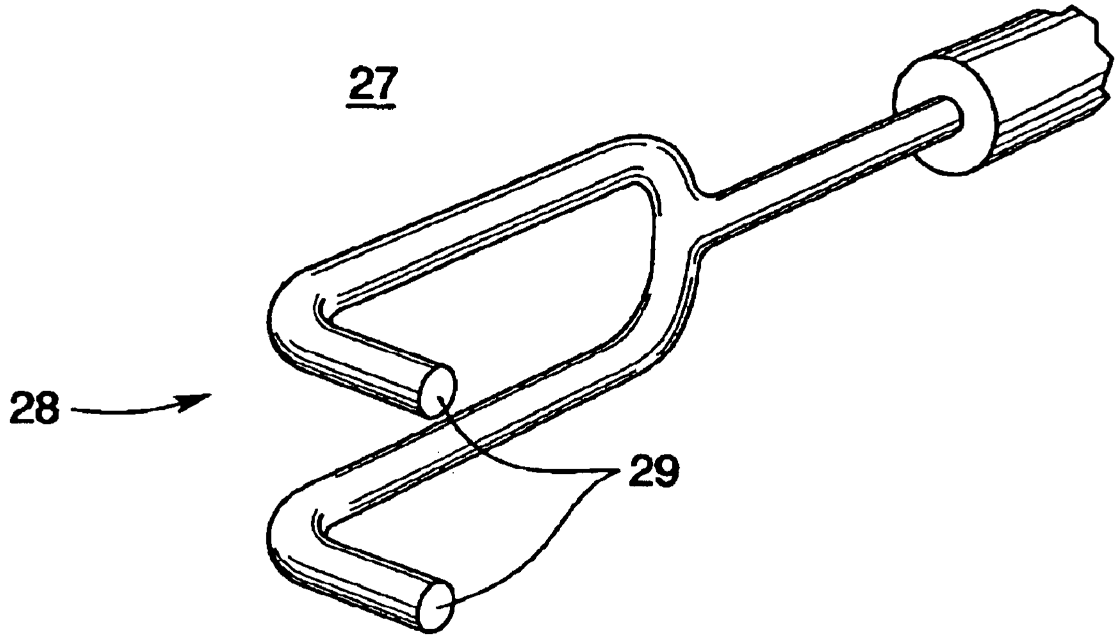
FIG. 11 illustrates a tool for adjusting the position of the differential pressure control pin according to one embodiment of the present invention.
Figure 12A:
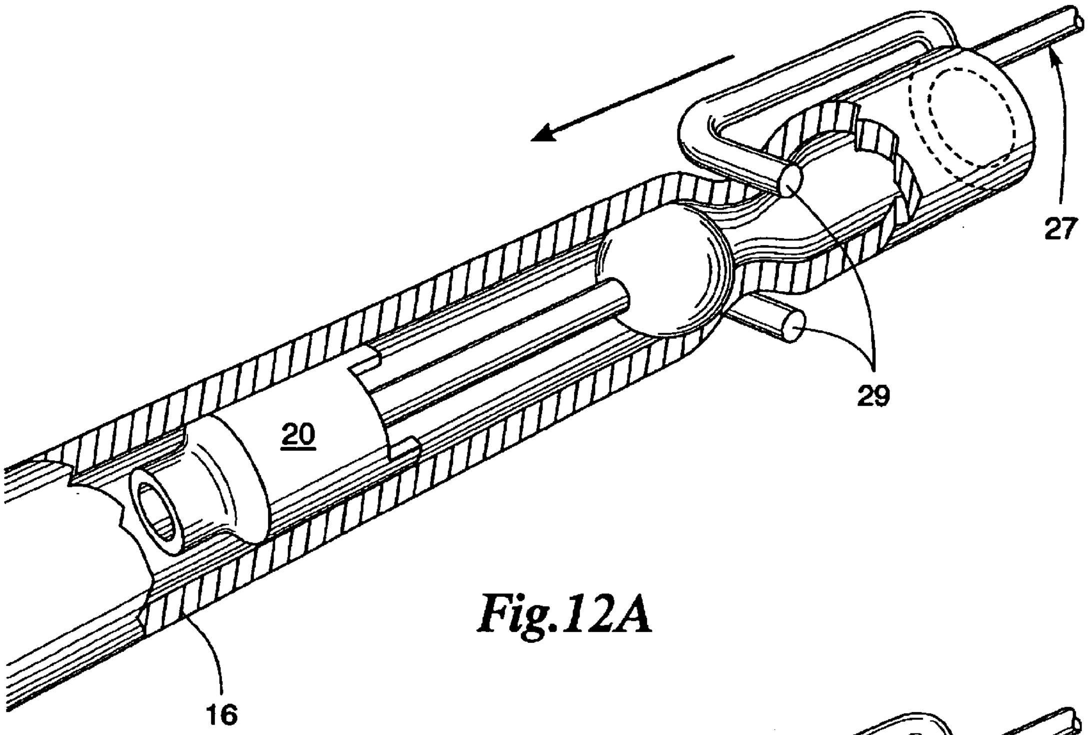
FIG. 12(*a*) illustrates the tool of FIG. 11 being used to disable one check-valve of the connecting conduit as illustrated in FIG. 9 according to one embodiment of the present invention.
Figure 12B:
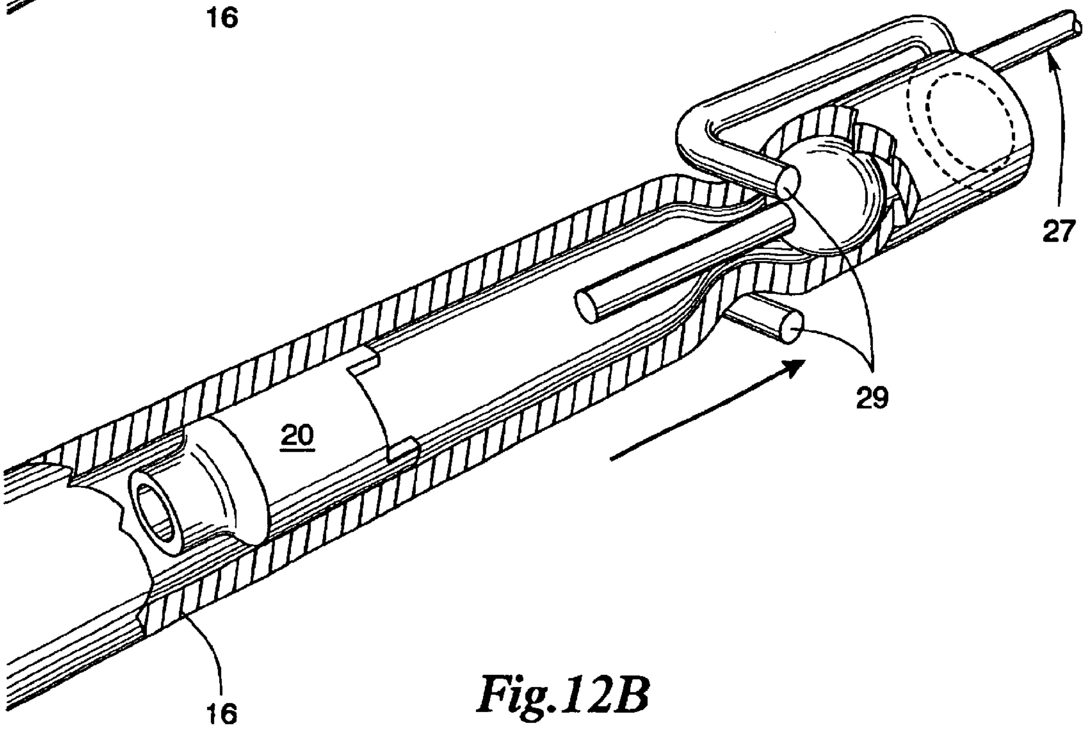

FIGS. 11, 12(*a*), and 12(*b*) illustrate a tool 28 and one method of using the tool 27 to adjust the position of the control pin 22, respectively, according to one embodiment of the present invention. The tool 27 includes a "forked" end 28 having two tines 29. The tines 29 are spaced such that, when the conduit 16 is placed between the tines 29, the tines 29 lightly compress the conduit 16 bilaterally in a "pinching" manner.

As illustrated in FIG. 12(*a*), the tines 29 may be pushed along the conduit 16 (as shown by the directional arrow in FIG. 12) such that the spherical end 26 and the rest of the control pin 22 are moved through the conduit until the elongated end 24 of the control pin 22 penetrates the aperture of the check-valve 20. When the elongated end 24 of the control pin 22 penetrates the aperture of a check-valve 20, the check-valve 20 is disabled until the control pin 22 is removed.

As illustrated in FIG. 12(*b*) the tines 29 may be pulled along the conduit 16 (as shown by the directional arrow in FIG. 12) such that the spherical end 26 (and the rest of the control pin 22) are moved through the conduit until the elongated end 24 exits the aperture of the check-valve 20. When the elongated end 24 exits the aperture of a check-valve 20, the check-valve 20 is enabled.

It should be noted that other types of tools may be used to move the control pin 22 through the conduit 16 while remaining within the scope of the present invention. It should further be noted that a non-spherical shaped end may be used for the control pin 22 while remaining within the scope of the present invention.

In the current embodiment, the serial check-valves 20 are placed within one or more of the connecting conduits 16 (flexible tubes) of the reciprocally connected cells 10 described in FIGS. 1–8 and FIGS. 13–18 to selectively configure a cushion array to achieve a predetermined distribution of internal pressures among the cells 10. Thus, an increased capability for controlling the interface pressure distribution of the cushion array, for example when a person is seated on the cushion, is achieved. By creating a series of pressure differentials between contiguous cells 10 (for example, in a radiating pattern away from an area of high interface pressure), it is possible to reduce the high interface pressure (i.e., between a user and the cushion array) by allowing the cells 10 in the region of high pressure to partially collapse. The partial collapse may be controlled by permitting the internal fluid (air) to be displaced to peripheral cells 10 through the check-valves 20 in the conduit 16.

Figure 13:
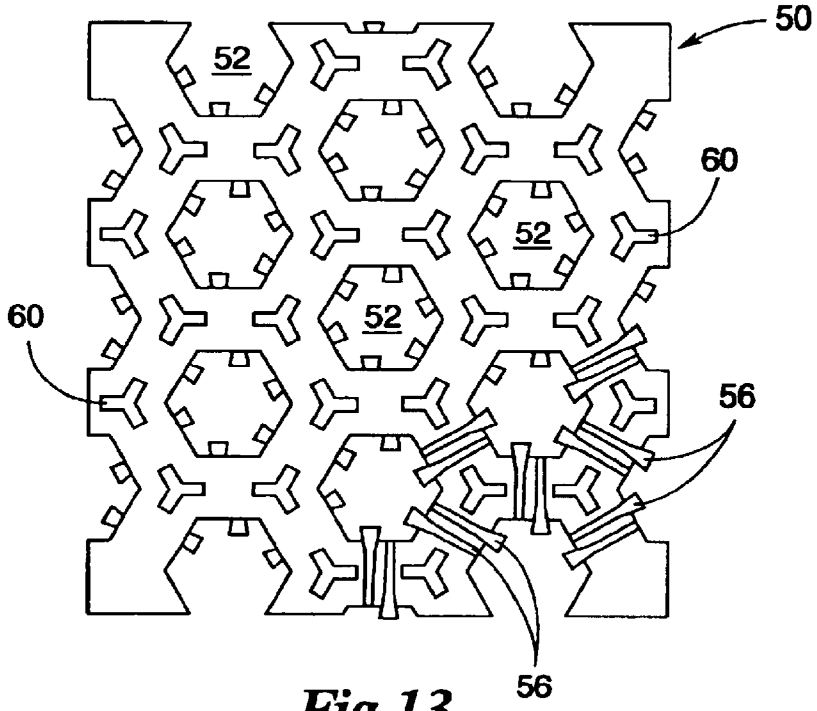
FIG. 13 is a top view of a hexagonal array configuration of a middle layer laminate for fabricating a cushion of the present invention.

FIGS. 13–17 illustrate a possible configuration and construction of the cushion of the present invention using bi-directional conduits and constrictors as previously described. Referring to FIG. 13, there is illustrated a laminated middle layer, generally 50, which includes cutouts 52 for allowing communication between top and bottom layers of cushion elements. As illustrated, the cutouts 52 of this embodiment are placed in a hexagonal array, to accommodate hexagonal cushion cells. Other shapes are, of course, possible. The middle layer 50 illustrated in FIG. 13 comprises laminated layers which may be fabricated of polymeric material (preferably non-permeable). These layers are structurally rugged and are relatively thin, for example, approximately in the range of 0.01–0.03 inches with respect to the thickness of the individual cells or cushion elements 54 illustrated in FIG. 14, which elements may be, for example, two to four inches in height. Experience has shown that a cellular cushion should be at least 3 inches high in order to prevent "bottoming out," i.e., total compression of one or more cells such that at least a portion of the buttocks is no longer cushioned. The layer 50, as illustrated in the breakaway section 13—13 of FIG. 13, also includes cutout spaces 56 for receiving conduits. This layer 50 may comprise two layers of material laminated together. Each laminate may be fabricated by known methods, including molding or stamping operations.

Figure 14:
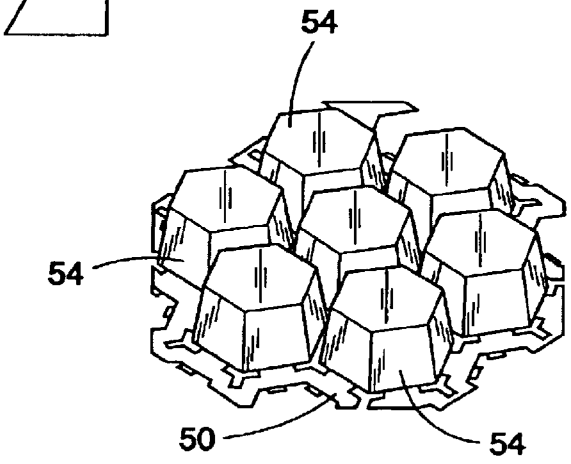
FIG. 14 is a perspective view of a hexagonal array of the cushion of the present invention, showing only the top cushion elements seated on the middle layer laminate.
Figure 15:
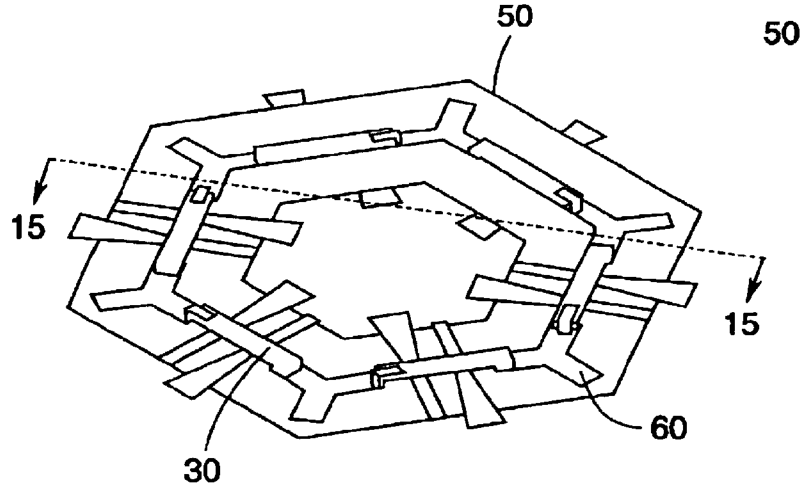
FIG. 15 is a perspective view of a hexagonal cell middle layer laminate with part of the layer's top lamina cut away along lines 15—15, to reveal conduits and constrictor clips of the present invention.
Figure 16:
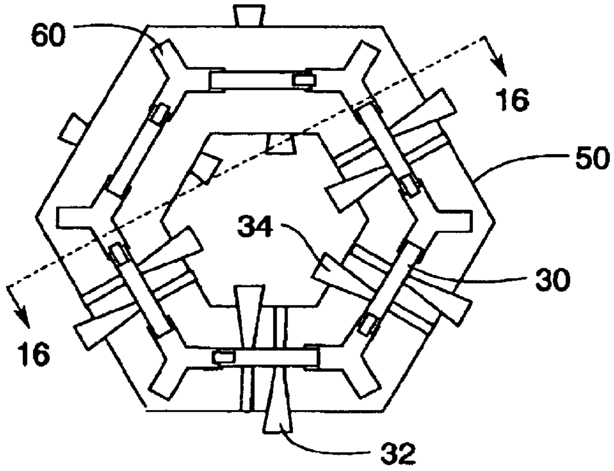
FIG. 16 is a top view of the cell of FIG. 15, with a portion of the cell's top lamina cut away along lines 16—16.
Figure 17:
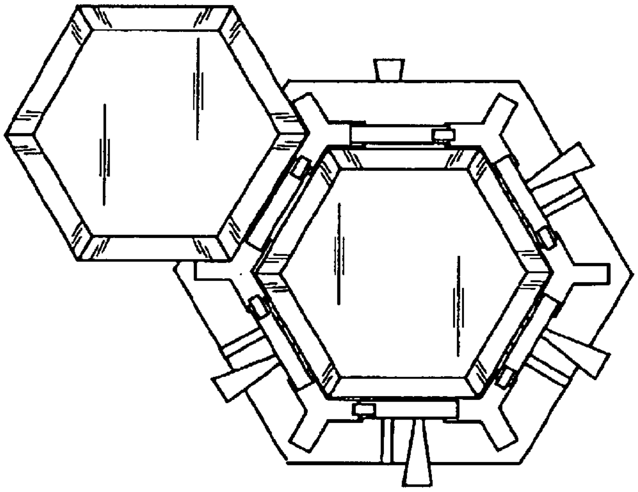
FIG. 17 is a top view of two adjacent cells of a hexagonal cell array of the present invention.

FIG. 14 illustrates a plurality of top cushion elements 54 attached to the top of the laminated middle layer 50 illustrated in FIG. 13. A similar set of bottom cushion elements may be adhered to the underside of the laminated middle layer 50. This attachment may be accomplished, for example, by adhesive and/or heat welding the materials together. The laminated middle layer 50 comprises the "backbone," providing structural continuity between the cells and also serves as the platform for positioning conduits and valves between adjacent cells. This is best illustrated in FIGS. 15 and 16, which illustrate the laminate 50 with inflow conduits 34, outflow conduits 32, and constrictor clips 30 positioned thereon. This positioning of the clips 30 is facilitated by the use of cut-out portions, including symmetrical "Y"- shaped cut-outs 60 and conduit receiving portions 56 as best seen in FIG. 13. As best seen in FIG. 16, the Y-shaped cut-outs 60 are sized and arrayed to receive the ends of the constrictor clips 18, thereby holding them securely in place.

While the embodiment illustrated in FIG. 14 employs cells of the same height, it is contemplated that cells of varying heights may be employed with the present invention. Furthermore, although the cushion illustrated has a "flat" top and/or bottom profile, in that the uppermost (or lowermost) sides of the cells lie in the same plane, it is to be understood that the top and/or bottom profile of the cushion may be contoured, rather than flat, such that the cushion may, for example, more readily conform to the surface on which it is placed, such as the seat of a wheelchair, or more readily conform to the contours of the person seated in the cushion.

Another embodiment of the invention includes more than one backbone or middle layer 50, providing a "stacked" arrangement of cells potentially several layers high.

In the preferred embodiment, the cells are interconnected to one another, but not to a common plenum, as is the case with prior art designs. This cell-to-cell connection allows for more stability than cushions using a plenum.

Figure 18:
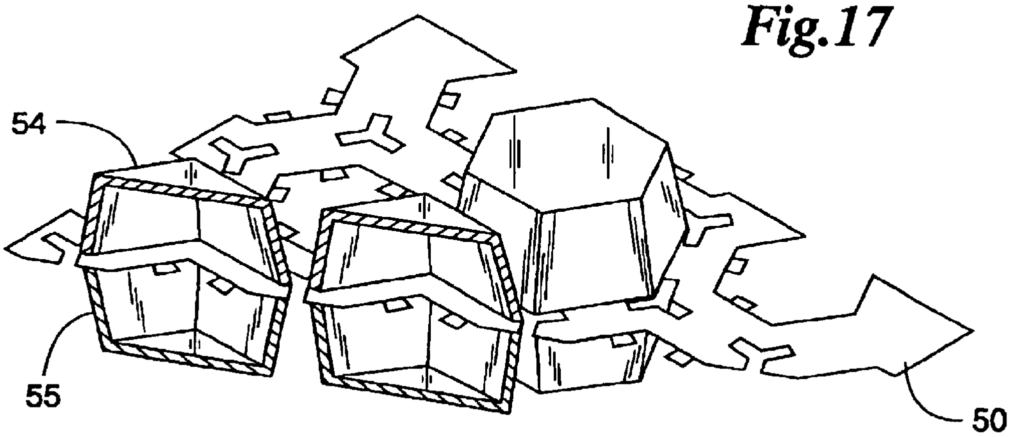
FIG. 18 is an isometric partial cross sectional view of a preferred embodiment of the invention.

Referring now to FIG. 18, there is illustrated a cross-sectional view of a cushion of the present invention, illustrating the middle layer 50 sandwiched between top cushion elements 54 and bottom cushion elements 55.

While the present invention has been described in terms of specific examples and preferred embodiments, such description is illustrative only, and not intended to limit in any way the scope of the invention, which is defined by the claims and all equivalents thereof. For example, while a preferred embodiment of the cushion is a seat cushion for primary use by an occupant in a seated position, it is to be understood that the invention may be employed for other cushioning applications, including without limitation, office furniture seats and/or backs, bed mattresses, home furniture, car seats and backs, arm rests, etc.

We claim:

1. A combination for controlling the flow of a fluid in a conduit, comprising:

a plurality of flow restriction devices disposed within said conduit;

a control device disposed within said conduit and operable to one of enable or disable at least one of said plurality of flow restriction devices, wherein said control device includes a pin having an elongated rod end and a spherical end, said rod end being operable to one of enable or disable at least one of said plurality of flow restriction devices and said spherical end being operable to prevent said control pin from passing through said plurality of flow restriction devices.

2. The combination of claim 1 wherein said plurality of flow restriction devices are one of check-valves and duckbill valves.

3. The combination of claim 1 wherein said plurality of flow restriction devices are serially disposed within said conduit.

4. The combination of claim 1 wherein said control device is hollow.

5. The combination of claim 1 wherein said each of said plurality of flow restriction devices has a differential pressure associated therewith, each of said differential pressures being substantially equal.

6. The combination of claim 1 wherein said each of said plurality of flow restriction devices has a standoff.

7. The combination of claim 1 wherein at least one end of said conduit is connected to a cell of a cushioning system.

* * * * *